United States Patent
Stewart et al.

[11] Patent Number: 6,123,000
[45] Date of Patent: Sep. 26, 2000

[54] CENTERING SPINDLE FOR A MACHINE TOOL INCLUDING AN ISOLATION SPACER

[75] Inventors: Max E. Stewart, Plainfield; Scott J. Huizenga; Michael D. Berry, both of Indianapolis, all of Ind.

[73] Assignee: Contour Hardeing, Inc., Indianapolis, Ind.

[21] Appl. No.: 09/148,527

[22] Filed: Sep. 4, 1998

[51] Int. Cl.$^7$ .................................................... B23B 23/00
[52] U.S. Cl. ................................ 82/150; 82/162; 82/164; 82/170; 82/903
[58] Field of Search ......................... 82/150, 152, 162, 82/163, 164, 148, 170, 903

[56] References Cited

U.S. PATENT DOCUMENTS

| | | | |
|---|---|---|---|
| 60,169 | 12/1866 | Gardiner | 82/170 |
| 333,619 | 1/1886 | Fairless . | |
| 490,918 | 1/1893 | McKenna . | |
| 855,858 | 6/1907 | Larson . | |
| 1,142,730 | 6/1915 | Rockwell . | |
| 1,750,079 | 3/1930 | Wills . | |
| 1,998,888 | 4/1935 | Wallgren | 308/237 |
| 2,035,338 | 3/1936 | Parker | 73/98 |
| 2,323,850 | 7/1943 | Scott | 308/77 |
| 2,484,801 | 10/1949 | Anderson | 82/170 X |
| 2,809,044 | 10/1957 | Landreth | 82/170 X |
| 2,881,034 | 4/1959 | Summers | 308/160 |
| 3,620,586 | 11/1971 | Mastsricht | 308/207 |
| 3,756,102 | 9/1973 | Casey | 82/40 |
| 3,924,906 | 12/1975 | Kitaoka | 308/1 |
| 3,943,803 | 3/1976 | Hafla | 82/30 |

*Primary Examiner*—Henry W. H. Tsai
*Attorney, Agent, or Firm*—Woodard, Emhardt, Naughton, Moriarty & McNett

[57] ABSTRACT

A centering spindle for use with a workpiece which is to be induction hardened includes a generally cylindrical outer housing into which a shaft is positioned and mounted in spaced relation to the housing by a bearing arrangement. The bearing arrangement allows the shaft to rotate relative to the housing. The end of the shaft extending out of the housing is connected to an isolation spacer which is fabricated out of an electrical insulator material. The isolation spacer in turn is attached to a removable tip which is constructed and arranged for interfacing with the workpiece to be induction hardened. The design of the centering spindle is such that the tip may be removed and replaced when it becomes worn without the need to replace any of the other parts or components of the centering spindle. Further, any electromagnetic field induced in the workpiece and transmitted to the tip will not be transmitted to the shaft nor to the bearing arrangement due to the isolation spacer. Additionally, any substantially elevated temperature which is experienced by the tip due to the heating of the workpiece will be insulated to some extent from reaching the shaft due to the thermal insulation properties of the material used for the isolation spacer.

21 Claims, 4 Drawing Sheets

CENTERING SPINDLE FOR A MACHINE TOOL INCLUDING AN ISOLATION SPACER

BACKGROUND OF THE INVENTION

The present invention relates generally to the field of induction hardening and the apparata and equipment normally associated with induction hardening machines. More specifically the present invention relates to the design of centering spindles which are used as part of induction hardening machines in order to support a workpiece, such as vertical centers (spindles) supporting a shaft.

Spindles of the type which have generally been described frequently include a bearing arrangement of some type which may include ball bearings, needle bearings, or both. What has been discovered is that the electromagnetic fields that are typically produced by induction hardening machines are transmitted to or through these bearings. These field currents tend to arc through the bearings and the lubricating medium and cause early failure through pitting and other conditions which are detrimental to bearing life.

Another aspect of using centering spindles which directly contact the workpiece is that the heat from the workpiece is transferred through the spindle to the bearings. Due to the substantial heat which is generated in the workpiece as part of the induction hardening process, heat transfer to the bearings can contribute to early or premature bearing failure.

A further consideration in the design of centering spindles of the type described herein is the mechanical wear on that portion of the centering spindle which directly contacts the workpiece. While there is some wear due to axial loading, it is the combination of rotary motion and axial loading which causes, over time, wear to occur. Wear to the tip of the centering spindle can affect the preciseness of the rotary motion which is to be imparted to the workpiece. Wear to the end or tip of the centering spindle can also affect the ability of the centering spindle to properly support the workpiece and maintain the necessary orientation for the workpiece. Wear to the end or tip of the centering spindle will ultimately force the centering spindle to be replaced.

It would be an improvement to the design of centering spindles of the type described herein which are used with induction hardening machines to electrically isolate or insulate the bearings from the current of any electromagnetic field which may be created during the induction hardening process. A further improvement would be to thermally isolate or insulate the bearings from the heat generated in the workpiece. A still further improvement would be to redesign the centering spindle so that only the worn tip or end portion of the centering spindle would actually have to be replaced, instead of the current practice of replacing the entire spindle when the degree of wear on the tip becomes unacceptable.

The present invention provides each of these improvements in a novel and unobvious manner as described and claimed herein.

SUMMARY OF THE INVENTION

A centering spindle for use with a workpiece which is to be induction hardened according to one embodiment of the present invention comprises a housing, a shaft having a first portion positioned within the housing and a second portion extending beyond the housing, a bearing arrangement positioned within the housing for cooperating with the first portion of the shaft for permitting rotary motion of the shaft relative to the housing, an isolation spacer attached to the second portion of the shaft and being fabricated out of material which serves as an electrical insulator so as to prevent an electromagnetic field induced in the workpiece from being conducted to the bearing arrangement and a tip removably attached to the isolation spacer for providing a means of engagement with the workpiece.

One object of the present invention is to provide an improved centering spindle for a workpiece which is to be induction hardened.

Related objects and advantages of the present invention will be apparent from the following description.

DESCRIPTION OF THE PREFERRED EMBODIMENT

Figure 1:
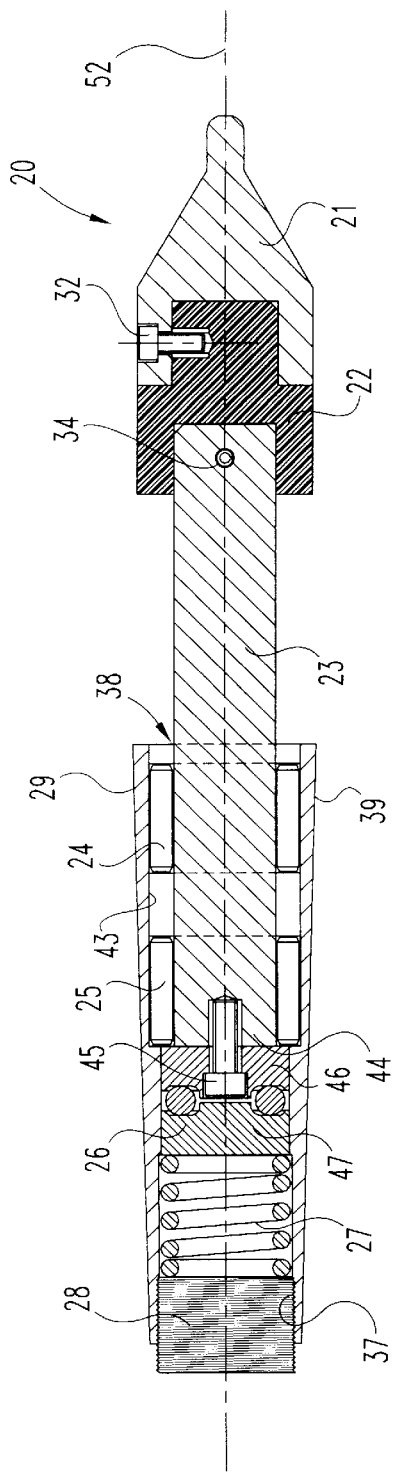
FIG. 1 is a side elevational view in full section of a centering spindle according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
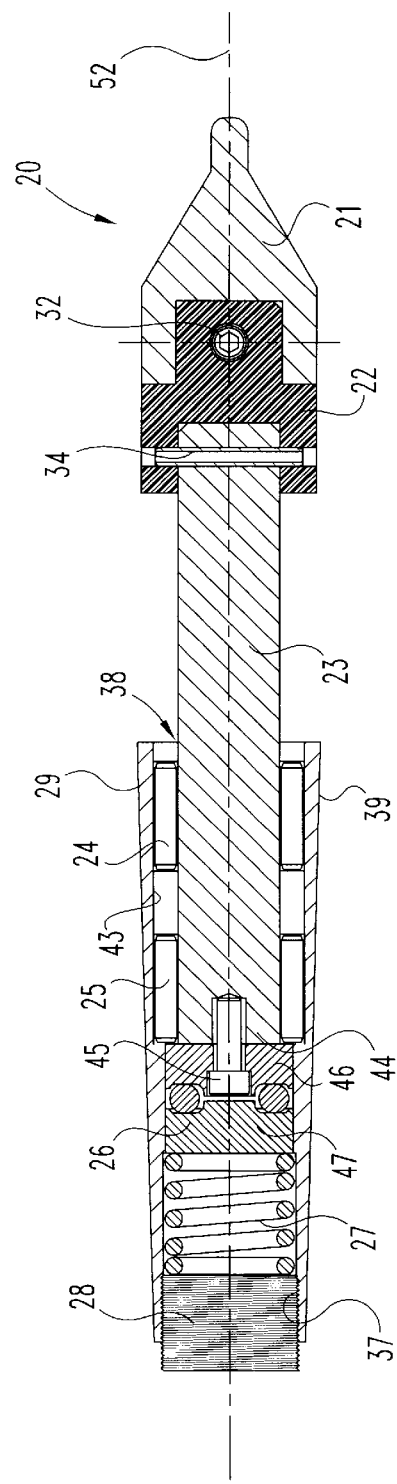
FIG. 2 is a top plan view in full section of the FIG. 1 centering spindle.
Figure 3:
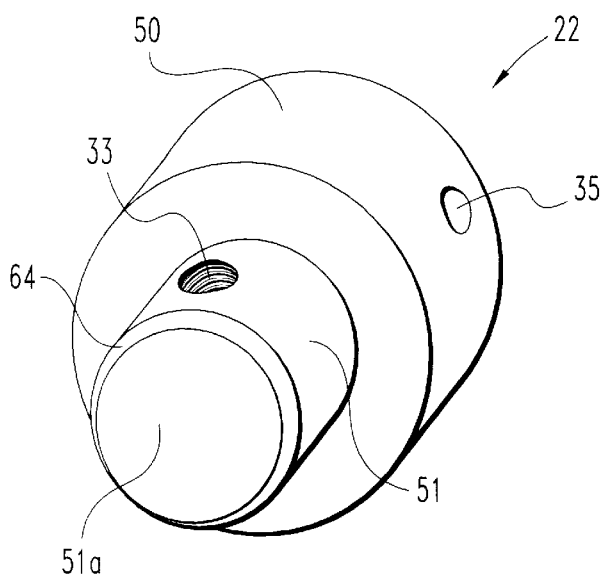
FIG. 3 is an enlarged perspective view of an isolation spacer comprising one portion of the FIG. 1 centering spindle.
Figure 4:
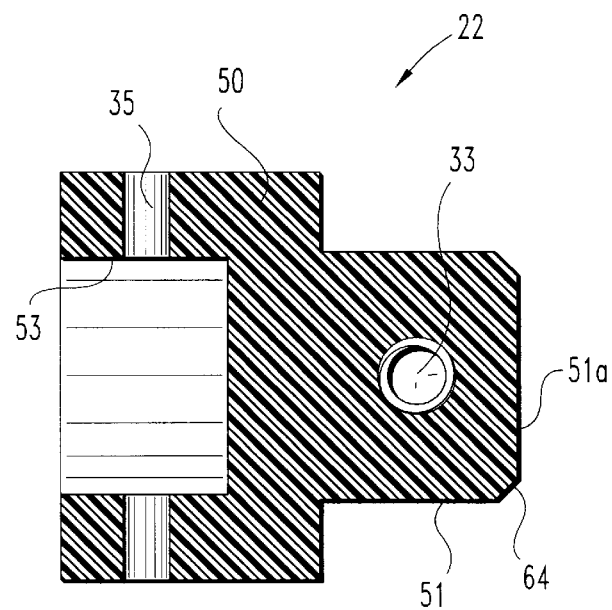
FIG. 4 is an enlarged top plan view in full section of the FIG. 3 isolation spacer.
Figure 5:
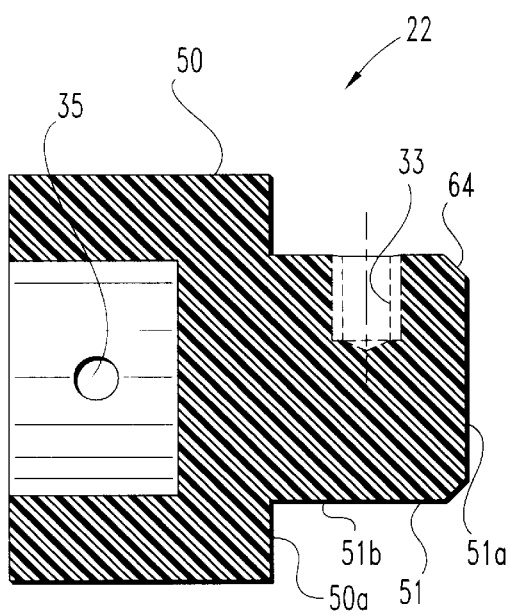
FIG. 5 is an enlarged side elevational view in full section of the FIG. 3 isolation spacer.
Figure 6:
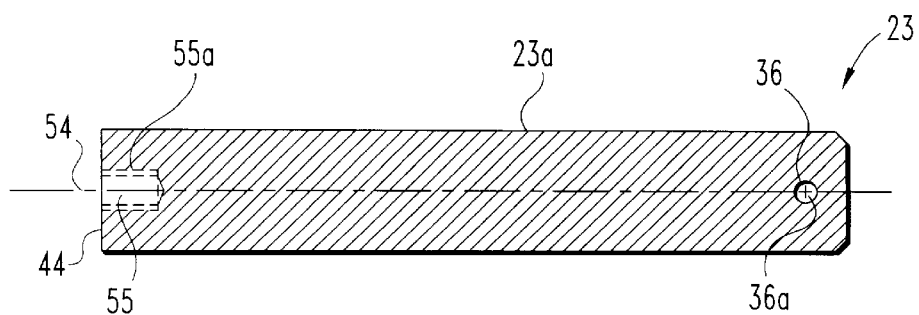
FIG. 6 is a side elevational view in full section of a shaft which comprises one portion of the FIG. 1 centering spindle according to the present invention.
Figure 7:
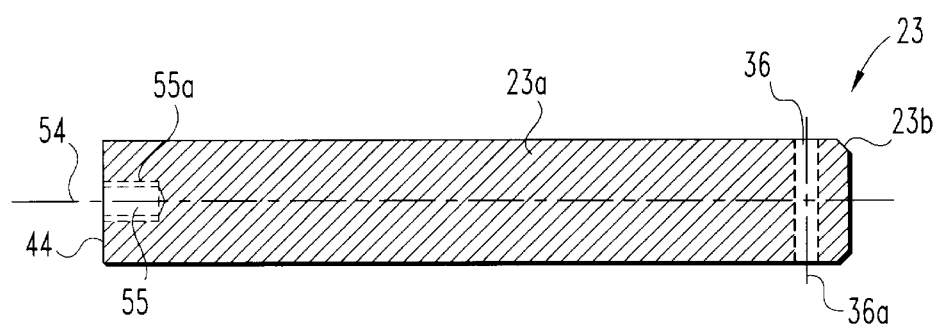
FIG. 7 is a top plan view in full section of the FIG. 6 shaft.
Figure 8:
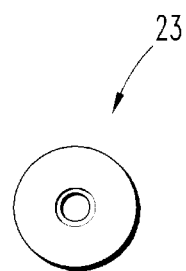
FIG. 8 is an end elevational view of the FIG. 6 shaft.
Figure 9:
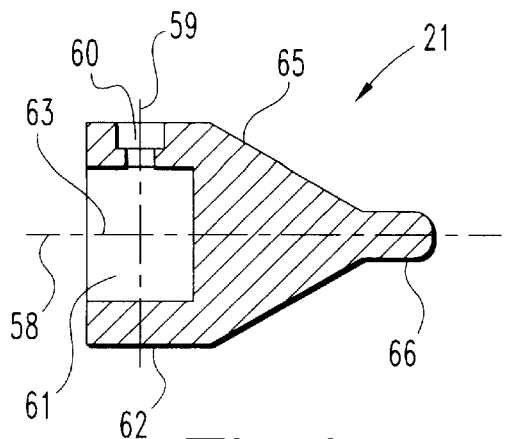
FIG. 9 is a side elevational view in full section of a tip which comprises one portion of the FIG. 1 centering spindle according to the present invention.
Figure 10:
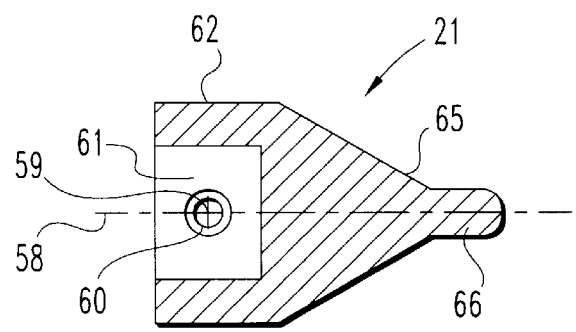
FIG. 10 is a top plan view in full section of the FIG. 9 tip.
Figure 11:
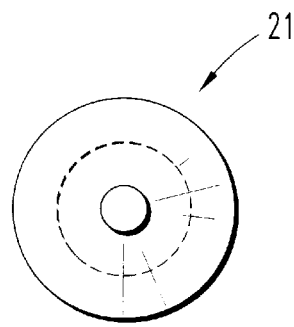
FIG. 11 is an end elevational view of the FIG. 9 tip.

Referring to FIGS. 1 and 2 there is illustrated a centering spindle 20 which is constructed and arranged to be used in the support of a workpiece as part of an induction hardening machine. Spindle 20 includes a tip 21, an insulator or isolation spacer 22, shaft 23, needle bearings 24 and 25, ball bearing 26, spring 27, plug 28, and housing 29. The insulator or isolation spacer 22 is illustrated in greater detail in FIGS. 3–5. The shaft 23 is illustrated in greater detail in FIGS. 6–8. The tip 21 is illustrated in greater detail in FIGS. 9–11.

Tip 21 is securely attached to the isolation spacer 22 by means of screw (or bolt) 32 which is received by the internally threaded blind hole 33. The insulator is securely attached to a first end of shaft 23 by the use of a spring pin 34 or, alternatively, a roll pin which is press fit into drilled hole 35 of isolation spacer 22 and which extends through drilled hole 36 of shaft 23.

The annular housing 29 has a hollow interior and is internally-threaded at end 37 with a clearance hole 38 for shaft 23 located at the opposite end 39. Positioned between the outside diameter of shaft 23 and the cylindrical inside surface 43 of housing 29 are the two sets of needle bearings 24 and 25. Attached to the end 44 of shaft 23 by bolt 45 is one race 46 of ball bearing 26. The opposite race 47 is spring-biased by means of spring 27 and plug 28 which is threaded into end 37. The degree of threaded advancement of the plug 28 into the internally-threaded end of housing 29 controls the degree or extent of spring force which is exerted on race 47 of ball bearing 26.

With reference to the detailed drawings, the isolation spacer or insulator 22 (see FIGS. 3–5) is a unitary, annular component with a first cylindrical portion 50 and a smaller diameter second cylindrical portion 51, wherein portions 50 and 51 are concentric with each other. Cylindrical bore 53 is a blind hole centered in portion 50 and substantially concentric with the outer surface of portion 50. End surface 50a is substantially parallel to end surface 51a and each surface is substantially perpendicular to the outer surface 51b of portion 51. The longitudinal centerline axis of blind hole 33 is substantially perpendicular to the longitudinal centerline axis of drilled hole 35. The longitudinal centerline axis of portion 50 is coincident with the longitudinal centerline axis of portion 51 and these centerline axes are coincident with the longitudinal axis of rotation of the centering spindle 20 as represented by centerline 52. Isolation spacer 22 is fabricated of a synthetic material which provides both electrical (relative to electromagnetic field) and thermal (relative to heating of the workpiece) isolation and insulation between tip 21 and shaft 23. This in turn provides both electrical and thermal insulation for the bearings disposed within housing 29. A suitable material for insulator 22 is polyetheretherketone.

Shaft 23 is a unitary, straight cylindrical member (see FIGS. 6–8) with a longitudinal centerline 54 that is coincident with centerline 52. The centerline axis 36a of drilled hole 36 is substantially perpendicular to the centerline axis 55a of the internally-threaded blind hole 55 which receives bolt 45. The outside diameter surface 23a of shaft 23 is sized for the desired fit with the inside diameter surfaces of needle bearings 24 and 25. The outside diameter surfaces of the needle bearings are sized, constructed, and arranged to fit within housing 29 and up against the cylindrical inside surface 43. The chamfered end 23a of shaft 23 is assembled into bore 53 and pinned in position by spring pin 34. The designed dimensional fit of the shaft 23 into the insulator 22 is a fit with a diametrical clearance of 0.000 to 0.002 inches.

Tip 21 is a unitary, annular member with a longitudinal centerline 58 which is coincident with centerlines 54 and 52. The centerline 59 of clearance hole 60 which receives bolt 32 is substantially perpendicular to centerline 58. Blind hole (or bore) 61 is substantially cylindrical and concentric with outer surface 62 and with axial centerline 63 which is coincident with centerline 58. Hole 61 receives cylindrical portion 51 with a fit of between a sliding fit and a slight clearance fit of between 0.000 and 0.004 inches on a diameter. The outer edge 64 of portion 51 is chamfered in order to preclude any corner interference with blind hole 61. Surface 65 is conical and protruding portion 66 which is concentric with hole 61 and surface 62 provides the support and the contacting mounting tip portion for the workpiece. The actual shapes of surface 65 and portion 66 are dependent on and predetermined by the workpiece shape, specifically the shape of the portion engaged by tip 21. Hole 60 is counterbored for the head of bolt 32 to be recessed below the outer surface 62.

In use, the protruding portion 66 of tip 21 is placed into a centering recess in the end of the workpiece for centering and support of the workpiece. Rotation of the workpiece results in some rotation of the shaft 23 relative to the housing 29 due in part to the needle bearings 24 and 25 and due in part to the ball bearing 26. Any electromagnetic field or current created in the tip as the workpiece is inductively heated is not conducted to the bearings due to the electrical insulative (non-conductive) properties of the material used for isolation spacer 22. Further, as the workpiece is heated during the induction hardening process, heat will be transferred to tip 21, but only a limited amount of heat from tip 21 is permitted to reach shaft 23 and in turn the bearings due to the thermal insulative property of the material used for isolation spacer 22. While any heat transfer from the tip to the shaft is substantially limited by the material used for isolation spacer 22, some small rise in the temperature of the shaft 23 would be expected. However, the elevation in temperature does not reach a level whereat there would be any concern with regard to the bearings.

If wear to tip 21 becomes a concern after some period of use, the tip can be easily replaced without needing to replace any of the other components or portions of centering spindle 20. Bolt 32 is simply removed, tip 21 is pulled off of portion 51, and a new tip is installed. Bolt 32 can be reused to securely connect the new tip to the isolation spacer 22.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A centering spindle for use with a workpiece which is to be induction hardened, said centering spindle comprising:
   a housing;
   a shaft having a first portion positioned within said housing and a second portion extending beyond said housing;
   bearing means positioned within said housing for cooperating with the first portion of said shaft for permitting rotary motion of said shaft relative to said housing;
   an isolation spacer attached to the second portion of said shaft and being fabricated out of a material which is an electrical insulator so as to prevent an electromagnetic field induced in said workpiece from being conducted to said bearing means; and
   a removable tip attached to said isolation spacer for providing a means of engagement with said workpiece.

2. The centering spindle of claim 1 wherein said bearing means includes a needle bearing positioned between said housing and said shaft.

3. The centering spindle of claim 2 wherein said bearing means further includes a ball bearing.

4. The centering spindle of claim 3 wherein the material selected for said isolation spacer is a thermal insulative material.

5. The centering spindle of claim 4 wherein the material selected for said isolation spacer is polyetheretherketone.

6. The centering spindle of claim 5 wherein said isolation spacer is constructed and arranged with a first substantially cylindrical portion which is received by said removable tip and a second substantially cylindrical portion which receives said shaft.

7. The centering spindle of claim 6 wherein said shaft defines a clearance hole and said second substantially cylindrical portion defines a pin bore and said centering spindle includes a pin which is positioned in said clearance hole and in said pin bore for joining said shaft and said isolation spacer together.

8. The centering spindle of claim 1 wherein the material selected for said isolation spacer is a thermal insulative material.

9. The centering spindle of claim 8 wherein the material selected for said isolation spacer is polyetheretherketone.

10. The centering spindle of claim 1 wherein said isolation spacer is constructed and arranged with a first substantially cylindrical portion which is received by said removable tip and a second substantially cylindrical portion which receives said shaft.

11. The centering spindle of claim 10 wherein said shaft defines a clearance hole and said second substantially cylindrical portion defines a pin bore and said centering spindle includes a pin which is positioned in said clearance hole and in said pin bore for joining said shaft and said isolation spacer together.

12. A centering spindle for use with a workpiece which is to be induction hardened, said centering spindle comprising:
- a housing;
- a shaft having a first end positioned within said housing and a second opposite end;
- a bearing positioned within said housing for cooperating with said shaft for permitting rotary motion of said shaft relative to said housing;
- a removable tip constructed and arranged for contacting the workpiece; and
- a spacer securely attached at a first end to the second opposite end of said shaft and separably connected at a second end to said removable tip, said spacer being fabricated out of a material which is a thermal insulator for reducing heat transfer from the removable tip to the shaft.

13. The centering spindle of claim 12 wherein said bearing is a needle bearing.

14. The centering spindle of claim 12 wherein said bearing is a ball bearing.

15. The centering spindle of claim 12 wherein the material selected for said spacer is an electrical insulator.

16. The centering spindle of claim 15 wherein the first end of said spacer is constructed and arranged with a first substantially cylindrical portion which is received by said removable tip and the second end of said spacer is constructed and arranged with a second substantially cylindrical portion which receives the second opposite end of said shaft.

17. The centering spindle of claim 16 wherein said shaft defines a clearance hole and said second substantially cylindrical portion defines a pin bore and said centering spindle includes a pin which is positioned in said clearance hole and in said pin bore for joining said shaft and said spacer together.

18. The centering spindle of claim 12 wherein the first end of said spacer is constructed and arranged with a first substantially cylindrical portion which is received by said removable tip and the second end of said spacer is constructed and arranged with a second substantially cylindrical portion which receives the second opposite end of said shaft.

19. The centering spindle of claim 18 wherein said shaft defines a clearance hole and said second substantially cylindrical portion defines a pin bore and said centering spindle includes a pin which is positioned in said clearance hole and in said pin bore for joining said shaft and said spacer together.

20. A centering spindle for use with a workpiece which is to be induction hardened, said centering spindle comprising:
- a housing;
- a shaft having a first portion positioned within said housing and a second portion extending beyond said housing;
- bearing means positioned within said housing for cooperating with the first portion of said shaft for permitting rotary motion of said shaft relative to said housing;
- an isolation spacer attached to the second portion of said shaft and being fabricated out of a material which is an electrical insulator so as to prevent an electromagnetic field induced in said workpiece from being conducted to said bearing means; and
- a tip attached to said isolation spacer for providing a means of engagement with said workpiece.

21. A centering spindle for use with a workpiece which is to be induction hardened, said centering spindle comprising:
- a housing;
- a shaft having a first end positioned within said housing and a second opposite end;
- a bearing positioned within said housing for cooperating with said shaft for permitting rotary motion of said shaft relative to said housing;
- a tip constructed and arranged for contacting the workpiece; and
- a spacer securely attached at a first end to the second opposite end of said shaft and separably connected at a second end to said tip, said spacer being fabricated out of a material which is a thermal insulator for reducing heat transfer from the tip to the shaft.

* * * * *

UNITED STATES PATENT AND TRADEMARK OFFICE
CERTIFICATE OF CORRECTION

PATENT NO : 6,123,000
DATED : September 26, 2000
INVENTOR(S) : Max E. Stewart, et al.

It is certified that an error appears in the above-identified patent and that said Letters Patent are hereby corrected as shown below:

In Col. 3, at line 58, replace "comer" with -- corner -- .

Signed and Sealed this

Seventeenth Day of April, 2001

Attest:

NICHOLAS P. GODICI

Attesting Officer

Acting Director of the United States Patent and Trademark Office